(12) United States Patent
Hotto

(10) Patent No.: US 8,651,210 B2
(45) Date of Patent: Feb. 18, 2014

(54) SYSTEM AND METHOD FOR EXTRACTING PROPULSION ENERGY FROM MOTOR VEHICLE EXHAUST

(71) Applicant: EnergyYield LLC, Carlsbad, CA (US)

(72) Inventor: Robert Hotto, Carlsbad, CA (US)

( * ) Notice: Subject to any disclaimer, the term of this patent is extended or adjusted under 35 U.S.C. 154(b) by 0 days.

(21) Appl. No.: 14/032,034

(22) Filed: Sep. 19, 2013

(65) Prior Publication Data

US 2014/0017523 A1 Jan. 16, 2014

Related U.S. Application Data

(63) Continuation of application No. 13/651,860, filed on Oct. 15, 2012, now Pat. No. 8,544,578, which is a continuation of application No. 12/423,763, filed on Apr. 14, 2009, now Pat. No. 8,286,742, which is a continuation of application No. 10/994,957, filed on Nov. 22, 2004, now Pat. No. 7,520,350.

(51) Int. Cl.
*B60K 6/32* (2007.10)
*B60K 13/04* (2006.01)

(52) U.S. Cl.
USPC .......... 180/65.31; 180/309; 903/944; 60/272

(58) Field of Classification Search
USPC ............ 180/65.21, 65.31, 309; 903/908, 944; 60/272, 278, 279
See application file for complete search history.

(56) References Cited

U.S. PATENT DOCUMENTS

| | | | |
|---|---|---|---|
| 6,458,478 B1 * | 10/2002 | Wang et al. | 429/411 |
| 6,908,700 B2 * | 6/2005 | Iio | 429/422 |
| 6,951,111 B2 * | 10/2005 | Chen | 60/775 |
| 7,051,518 B2 * | 5/2006 | Benz et al. | 60/286 |
| 7,147,072 B2 * | 12/2006 | Botti | 180/65.25 |
| 2004/0053087 A1 * | 3/2004 | Akikusa et al. | 429/20 |

* cited by examiner

*Primary Examiner* — John Walters
(74) *Attorney, Agent, or Firm* — Denko Coburn Lauff LLP

(57) ABSTRACT

Engine exhaust is sent to a reformer, which produces hydrogen from fuel remaining in the exhaust. The hydrogen may be stored in a hydrogen tank, and may be used by a fuel cell to produce electricity to recharge a vehicle battery and/or to supply propulsion current to an electric propulsion system.

17 Claims, 2 Drawing Sheets

System

SYSTEM AND METHOD FOR EXTRACTING PROPULSION ENERGY FROM MOTOR VEHICLE EXHAUST

CROSS REFERENCE TO RELATED APPLICATIONS

This application is a continuation of and claims priority to U.S. Utility patent application Ser. No. 13/651,860, filed on Oct. 15, 2012, to be issued as U.S. Pat. No. 8,544,578 on Oct. 1, 2013, which is a continuation of U.S. patent application Ser. No. 12/423,763, filed Apr. 14, 2009, now U.S. Pat. No. 8,286,742, which is a continuation of U.S. Utility patent application Ser. No. 10/994,957, entitled SYSTEM AND METHOD FOR EXTRACTING PROPULSION ENERGY FROM MOTOR VEHICLE EXHAUST, filed on Nov. 22, 2004, now U.S. Pat. No. 7,520,350, the contents of which are incorporated by reference herein in their entirety for all purposes.

FIELD OF THE INVENTION

The present invention relates generally to motor vehicles.

BACKGROUND

The importance of energy conservation goes without saying. Not only must fossil fuels be conserved for future use, but limiting the amount of fossil fuels that must be burned appears to be highly beneficial for the environment. However, many proposals for improving vehicle energy consumption efficiency cannot be realistically implemented any time soon. Hence, the present invention.

SUMMARY

The present invention is directed generally to systems and methods for enhancing fuel utilization in an engine. In one aspect the present invention is related to a system for enhancing fuel utilization in an internal combustion engine, comprising a pipe coupled to the engine to receive engine exhaust gases and a reformer connected to the pipe, the reformer configured to produce hydrogen from hydrocarbons in the exhaust gases.

In another aspect, the present invention is related to a method for enhancing fuel utilization in an internal combustion engine, comprising generating exhaust gases from combustion in the engine, coupling the exhaust gases from the engine to a reformer configured to produce hydrogen from the exhaust gases and transferring the hydrogen to a hydrogen storage tank or a fuel cell.

In another aspect, the present invention is related to a method of enhancing combustion engine operation, comprising receiving, at a reformer having an input coupled to an exhaust output of the engine, exhaust gases produces by the engine, generating in the reformer, from hydrocarbons in the exhaust gases, hydrogen and transferring the hydrogen to a hydrogen storage tank or a fuel cell.

Additional aspects of the present invention are further described below with respect to the appended drawings.

BRIEF DESCRIPTION OF THE DRAWINGS

The following is a brief description of the drawings wherein.

DETAILED DESCRIPTION

Figure 1:
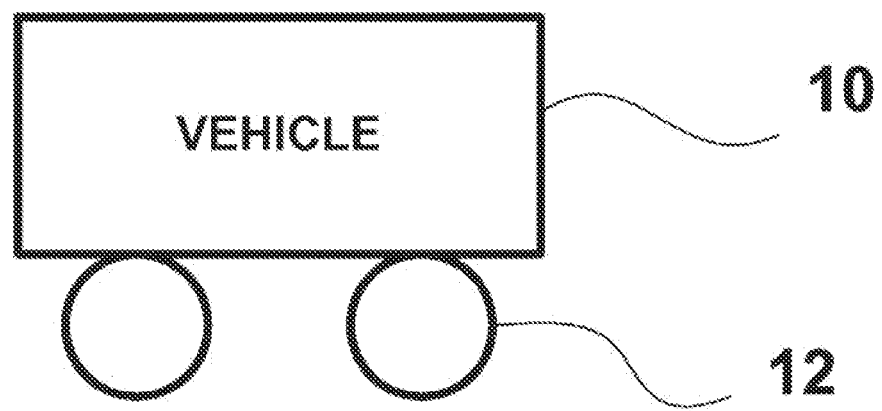
FIG. 1 is a schematic representation of a motor vehicle.

FIG. 1 shows a motor vehicle 10 that may use the present propulsion system to cause one or more wheels 12 to rotate and move the vehicle 10. The vehicle 10 may be an automobile, truck, motorcycle, or other wheeled vehicle. The present principles also apply to non-wheeled vehicles including boats, aircraft, or other vehicles that use an internal combustion engine.

Figure 2:
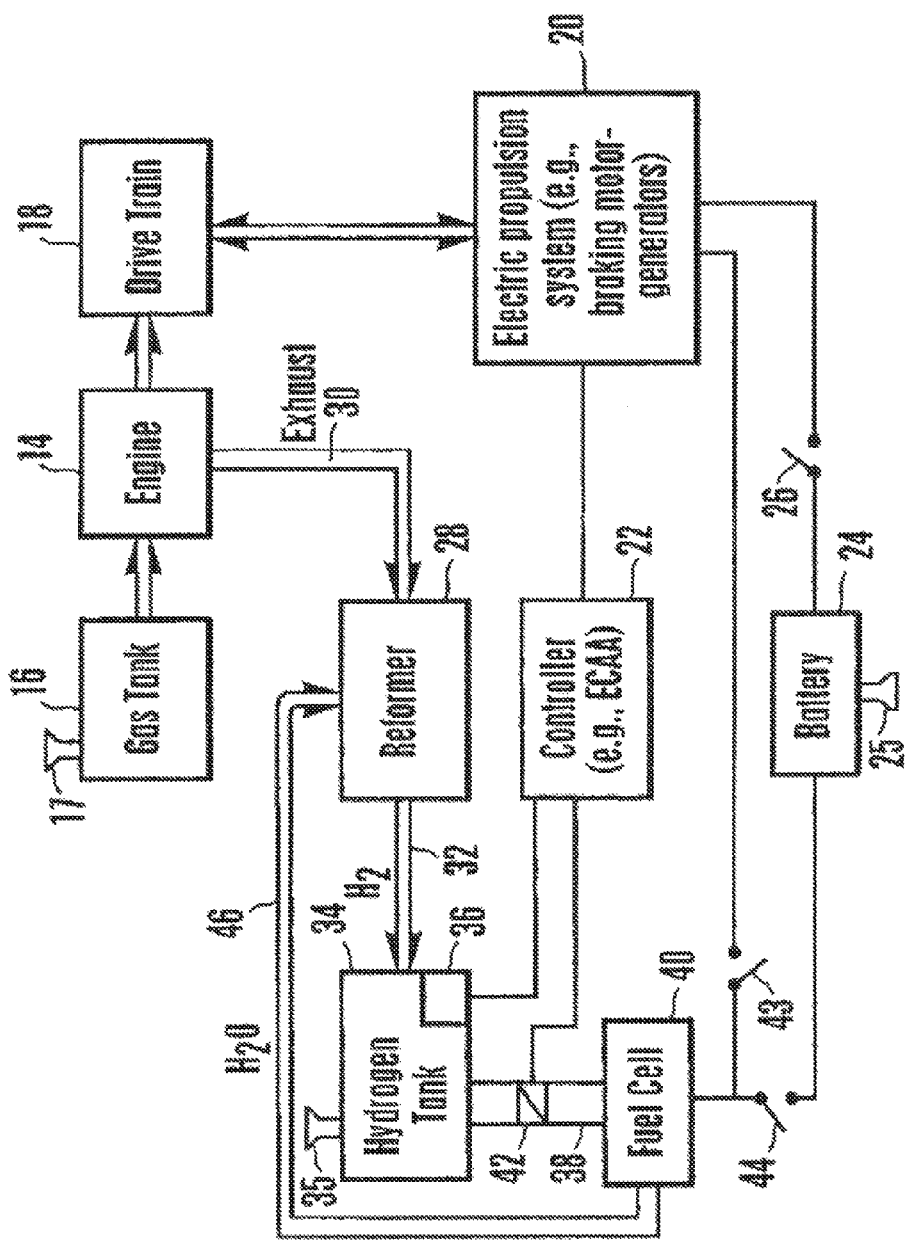
FIG. 2 is a block diagram of an embodiment of the present invention, with double lines illustrating mechanical couplings and single lines indicating electrical connections.

FIG. 2 shows that the present propulsion system includes an internal combustion engine 14 that can be a four stroke (e.g., gasoline) engine or two stroke (e.g., diesel) engine. The engine 14 receives hydrocarbon fuel from a gas tank 16 (that can be filled at a service station with gas through a filler pipe 17), and the engine outputs torque to a drive train 18 that can include a combination of components known in the art, e.g., crankshafts, transmissions, axles, and so on.

Additionally, the propulsion system can include an electrical propulsion system 20 such as braking motor-generators, sometimes referred to as "regenerators", in accordance with hybrid vehicle principles known in the art. Briefly, braking motor-generators work in response to signals that can be sent from a controller 22, such as might be implemented in an engine control module (ECM). When a brake pedal is depressed by a driver, the ECM activates the braking motor generators (by, e.g., supplying field current to them), which act as electro-magnetic brakes in cooperation with complementary structure on the wheels or axle or other part of the drive train 18 to slow the vehicle down. In this mode, the braking motor-generators act as generators, outputting electricity to a vehicle battery 24 through a main battery switch 26 that is controlled by the controller 22 to shut the switch. If desired, the battery 24 also can be recharged at a service station through a recharging line 25. On the other hand, the controller 22, which also controls the engine 14, can cause the engine 14 to stop and/or to be disengaged from the drive train 18 to conserve fuel, and instead cause the battery 24 to supply propulsion power through the switch 26 to the braking motor-generators, which act as motors to cause the complementary structure in the drive train 18 to turn.

The controller 22 may be implemented by any suitable processing apparatus, including a digital signal processor (DSP) or computer microprocessor, to execute the logic set forth further below. The logic below may be implemented by plural controllers.

Thus far, a so-called "hybrid" vehicle has been described. In accordance with the present invention, however, in addition to the power sources discussed above, the exhaust from the engine 14 is supplied to a reformer 28 through an exhaust pipe 30. According to reformer principles known in the art, the reformer 28 produces hydrogen from the exhaust gases, e.g., from unburnt fuel that remains in the engine exhaust. As critically recognized herein, the exhaust from the engine is hot, facilitating performance of the reformer 28.

Hydrogen from the reformer 28 is directed through a hydrogen line 32 to a hydrogen tank 34 for storage. If desired, in addition to receiving hydrogen from the reformer 28, the hydrogen tank 34 can be filled at a service station with hydrogen through a filler pipe 35. The hydrogen tank 34 may include a detector 36 that generates an electrical signal representative of the amount of hydrogen in the tank, and this signal may be sent to the controller 22. Hydrogen from the tank 34 can be supplied through a fuel cell line 38 to a fuel cell 40, which uses the hydrogen to generate electricity in accordance with fuel cell principles known in the art. A valve 42 such as a solenoid valve may be controlled by the controller 22 in accordance with logic below to selectively block or unblock the fuel cell line 38. Water can be returned from the fuel cell 40 if desired to the reformer 28 through a water line 46.

Further, the present invention recognizes that the exhaust gas that remains after being stripped of hydrogen in the reformer 28 possesses newly exposed carbon bonds, and consequently may be recycled back to the engine 14 from the reformer 28 for further combustion.

As shown in FIG. 2, the fuel cell 40 can output propulsion current to the electric propulsion system 20 through a fuel cell switch 43, which is controlled by the controller 22. Also, if desired the fuel cell 40 can output recharging current to the battery 44 through a recharging switch 44, which is controlled by the controller 22 to recharge the battery 24. In some implementations the fuel cell 40 can output current directly to the electrical propulsion system 20 as shown as well as to the battery 24, or it may output current only to the electrical propulsion system 20, or it may output only recharging current to the battery 24.

The switches discussed above may be electro-mechanical or electrical, e.g., they may be implemented by field effect transistors (FET).

With the above system architecture in mind, the controller 22 can cause the drive train to be powered by the engine 14, with the reformer 28 producing hydrogen for storage in the hydrogen tank 34 and with the switches 26, 43, 44 open and valve 42 shut. If the controller 22 determines that the state of charge of the battery 24 and operational mode (including demanded speed, etc.) of the vehicle 10 warrant it, the controller 22 can decouple the engine 14 from the drive train 18 and close the battery switch 26 cause the battery 24 to supply propulsion current to the electric propulsion system 20.

Yet again, regardless of whether the battery 24 can be used in the particular implementation to propel the vehicle, the controller 22 can, when conditions warrant and the amount of hydrogen in the hydrogen tank 34 indicates a sufficient amount of hydrogen, cause the valve 42 to open. This ports hydrogen to the fuel cell 40, which outputs electricity. The controller 22 may cause the recharging switch 44 to close to recharge the battery 24 from the fuel cell 40, and/or it may cause the fuel cell switch 43 to close to send propulsion current to the electric propulsion system 20 (in which case the engine 14 would be decoupled from the drive train 18).

While the particular SYSTEM AND METHOD FOR EXTRACTING PROPULSION ENERGY FROM MOTOR VEHICLE EXHAUST as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system for providing propulsion for a vehicle, the system comprising:
   an internal combustion engine configured to produce exhaust gas;
   a reformer configured to provide hydrogen from hydrocarbons in the exhaust gas from the internal combustion engine;
   a fuel cell configured to produce electricity from the hydrogen provided by the reformer; and
   an electric propulsion system configured to provide propulsion for the vehicle from the electricity produced by the fuel cell.

2. The system of claim 1 further comprising a battery.

3. The system of claim 1 further comprising a controller configured to control provision of the hydrogen produced by the reformer to the fuel cell.

4. The system of claim 3 further comprising a battery.

5. The system of claim 1 further comprising controller configured to control the electric propulsion system.

6. The system of claim 1 further comprising a pathway from the reformer to the internal combustion engine for passage of hydrogen-stripped gas from the reformer to the internal combustion engine.

7. The system of claim 6 further comprising a battery.

8. A vehicle comprising:
   an internal combustion engine configured to produce exhaust gas;
   a reformer configured to receive exhaust gas from the internal combustion engine and provide hydrogen from hydrocarbons in the exhaust gas;
   a fuel cell configured to produce electricity from the hydrogen provided by the reformer; and
   an electric propulsion system configured to provide propulsion for the vehicle from the electricity produced by the fuel cell.

9. The vehicle of claim 8 further comprising a battery.

10. The vehicle of claim 8 further comprising a storage tank configured for storage of hydrogen from the reformer.

11. The vehicle of claim 10 further comprising a battery.

12. The vehicle of claim 10 further comprising a fluid path and a valve, the fluid path being interposed between the storage tank and the fuel cell for passage of the hydrogen from the storage tank to the fuel cell and the valve being configured to open and close the fluid path.

13. The vehicle of claim 12 further comprising a controller configured to control the valve.

14. The vehicle of claim 8 further comprising a controller configured to control the electric propulsion system.

15. The vehicle of claim 8 in which the vehicle is a truck.

16. The vehicle of claim 8 in which the vehicle is an automobile.

17. The vehicle of claim 8 in which the vehicle is a boat.

* * * * *